US008928982B2

(12) United States Patent
Teramoto et al.

(10) Patent No.: US 8,928,982 B2
(45) Date of Patent: Jan. 6, 2015

(54) WAFER LENS, LAMINATED WAFER LENS, WAFER LENS CUTTING METHOD AND LAMINATED WAFER LENS CUTTING METHOD

(75) Inventors: Tougo Teramoto, Wakayama (JP); Akira Sato, Ritto (JP); Tohru Tominami, Machida (JP)

(73) Assignee: Konica Minolta Advanced Layers, Inc., Tokyo (JP)

( * ) Notice: Subject to any disclaimer, the term of this patent is extended or adjusted under 35 U.S.C. 154(b) by 151 days.

(21) Appl. No.: 13/642,654

(22) PCT Filed: Apr. 20, 2011

(86) PCT No.: PCT/JP2011/059677
§ 371 (c)(1),
(2), (4) Date: Oct. 22, 2012

(87) PCT Pub. No.: WO2011/132690
PCT Pub. Date: Oct. 27, 2011

(65) Prior Publication Data
US 2013/0038952 A1 Feb. 14, 2013

(30) Foreign Application Priority Data

Apr. 21, 2010 (JP) ................................. 2010-097653

(51) Int. Cl.
*G02B 27/10* (2006.01)
*G02B 13/00* (2006.01)
*G02B 3/00* (2006.01)
(52) U.S. Cl.
CPC .......... *G02B 13/0085* (2013.01); *G02B 3/0056* (2013.01); *G02B 3/0012* (2013.01); *G02B 13/006* (2013.01)
USPC .......................................... 359/619; 359/620

(58) Field of Classification Search
CPC .. G02B 3/0012; G02B 3/0056; G02B 13/006; G02B 13/0085
USPC ................................... 359/619, 620
See application file for complete search history.

(56) References Cited

U.S. PATENT DOCUMENTS 5,973,844 A * 10/1999 Burger .......................... 359/622

FOREIGN PATENT DOCUMENTS

| JP | 7-283179 | 10/1995 |
|---|---|---|
| JP | 11-111650 | 4/1999 |
| JP | 2001-215305 | 8/2001 |
| JP | 2009-226631 | 10/2009 |
| JP | 2011-059688 | 3/2011 |
| WO | WO 2007/107028 | 9/2007 |
| WO | WO 2009/116448 | 9/2009 |
| WO | WO 2010/032511 | 3/2010 |
| WO | WO 2010/143466 | 12/2010 |

* cited by examiner

*Primary Examiner* — William Choi
(74) *Attorney, Agent, or Firm* — Cozen O'Connor

(57) ABSTRACT

A laminated wafer lens includes a wafer lens and a spacer substrate bonded to each other. The wafer lens includes a resin section provided on a surface of a glass substrate. The resin section includes lens portions and interval portions, each interval portion provided between adjacent lens portions. The spacer substrate has openings at positions corresponding to the respective lens portions. The lens portions are arrayed in row and column directions in a matrix fashion. The interval portions include first and second interval portions, the second interval portion longer than the first interval portion. The spacer substrate includes interval portions each of which is provided between adjacent openings. The interval portions include third and fourth interval portions corresponding to the first and second interval portions, respectively, the fourth interval portion being longer than the third interval portion.

10 Claims, 13 Drawing Sheets

WAFER LENS, LAMINATED WAFER LENS, WAFER LENS CUTTING METHOD AND LAMINATED WAFER LENS CUTTING METHOD

RELATED APPLICATIONS

This is a U.S. National Phase Application under 35 USC 371 of International Application PCT/JP2011/059677 filed on Apr. 20, 2011.

This application claims the priority of Japanese application no. 2010-097653 filed Apr. 21, 2010, the entire content of which is hereby incorporated by reference.

TECHNICAL FIELD

The present invention relates to a wafer lens, a laminated wafer lens, a wafer lens cutting method, and a laminated wafer lens cutting method.

BACKGROUND ART

There has been known a technique to provide a lens portion, composed of curable resin, on a glass substrate to obtain a hybrid optical device (lens) with a high heat-resistance. In an example of the method of manufacturing an optical device using this technique, a so-called wafer lens is formed, which wafer lens includes a plurality of lens portions composed of curable resin on the surface of a glass substrate; and the glass substrate is then cut between the lens portions.

In such a case, the resin part constituting the lens portions is subjected to stress (tensile force). When the glass substrate is cut, the stress of the resin part is released, and the resin part could be separated (rolled up) from the glass substrate.

In the technique of Patent Document 1, therefore, a wide cut is once made in the resin part to reduce the stress of the resin part, and then the glass substrate is cut along a narrow cutting line.

Moreover, as a method to reduce the stress, the technique of Patent Document 2 has been known. In this technique, separated resin sections are formed on the glass substrate (in a state where gaps are formed between the resin sections) to previously reduce the stress of the resin part on the glass substrate.

PRIOR ART DOCUMENTS

Patent Documents

Patent Document 1: International Publication No. 2007/107028 (FIG. 6 and the like)
Patent Document 2: International Publication No. 2009/116448 (Paragraph 0175, FIGS. 10 and 11, and the like)

DISCLOSURE OF INVENTION

Problems to be Solved by the Invention

In the technique of Patent Document 1, cutting along the cutting line is performed in two steps to reduce the stress of the resin part. However, this technique does not take into consideration cracks of the glass substrate due to the cutting. To be specific, the resin part is subjected to unexpectedly large stress, and if the stress is sharply reduced by cutting, the glass substrate could be broken. In this case, the optical devices which are obtained after the cutting process are defectives and cannot be treated as products.

On the other hand, according to Patent Document 2, although the resin sections are formed on the glass substrate, it takes a lot of work to partially form the resin sections in such a manner. It is therefore not possible to enjoy enough benefits of mass production using wafer lenses. Moreover, the technique disclosed in Patent Document 2 is mainly aimed at a molding die made of resin and does not take into consideration cutting of the glass substrate.

An object of the present invention is to provide a wafer lens, a laminated wafer lens, a wafer lens cutting method, and a laminated wafer lens cutting method which allow efficient and easy production of the wafer lens and which are capable of solving the problems due to cracks of the glass substrate, while reducing the stress of the resin part on the glass substrate.

Means for Solving Problems

In order to solve the above-mentioned problems, according to a first aspect of the present invention, there is provided a wafer lens including: a glass substrate; and a resin section which is made of energy-curable resin and is provided on a surface of the glass substrate, the resin section including: a plurality of lens portions, and a plurality of interval portions each of which is provided between adjacent lens portions among the lens portions, wherein the lens portions are arrayed in row and column directions in a matrix fashion; and the interval portions include a first interval portion and a second interval portion, a length of the second interval portion being longer than a length of the first interval portion.

According to a second aspect of the present invention, there is provided a laminated wafer lens including: a wafer lens including: a glass substrate, and a resin section which is made of energy-curable resin and is provided on each of front and back surfaces of the glass substrate, the resin section including: a plurality of lens portions, and a plurality of interval portions each of which is provided between adjacent lens portions among the lens portions; and a spacer substrate bonded to one surface of the wafer lens, the spacer substrate having openings at positions corresponding to the lens portions, respectively, wherein the lens portions provided on both sides of the wafer lens are arrayed in row and column directions in a matrix fashion; and the interval portions provided on both sides of the wafer lens include a first interval portion and a second interval portion, a length of the second interval portion being longer than a length of the first interval portion.

According to a third aspect of the present invention, there is provided a laminated wafer lens including: a first wafer lens including: a glass substrate, and a resin section which is made of energy-curable resin and is provided on each of front and back surfaces of the glass substrate, the resin section including: a plurality of lens portions, and a plurality of interval portions each of which is provided between adjacent lens portions among the lens portions; a second wafer lens bonded to the first wafer lens, the second wafer lens including: a glass substrate, and a resin section which is made of energy-curable resin and is provided on each of front and back surfaces of the glass substrate, the resin section including: a plurality of lens portions, and a plurality of interval portions each of which is provided between adjacent lens portions among the lens portions; and a spacer substrate bonded to one surface of the second wafer lens, the spacer substrate having openings at positions corresponding to the lens portions, respectively, of the second wafer lens, wherein the lens portions provided on both sides of each of the first and second wafer lenses are arrayed in row and column directions in a matrix fashion; and the interval portions provided on both sides of each of the first and second wafer lenses include a first interval portion and a second interval portion, a length of the second interval portion being longer than a length of the first interval portion.

According to a fourth aspect of the present invention, there is provided a method of cutting a wafer lens, the wafer lens including: a glass substrate; and a resin section which is made of energy-curable resin and is provided on a surface of the glass substrate, the resin section including: a plurality of lens portions, and a plurality of interval portions each of which is provided between adjacent lens portions among the lens portions, wherein the lens portions are arrayed in row and column directions in a matrix fashion; and the interval portions include a first interval portion and a second interval portion, a length of the second interval portion being longer than a length of the first interval portion, the method including: a first step of cutting the second interval portion; a second step of cutting the resin section and the glass substrate between a cutting line formed in the first step and the lens portions adjacent to the cutting line; and a third step of cutting the first interval portion and the glass substrate after the first step.

According to a fifth aspect of the present invention, there is provided a method of cutting a laminated wafer lens, the laminated wafer lens including: a wafer lens including: a glass substrate, and a resin section which is made of energy-curable resin and is provided on each of front and back surfaces of the glass substrate, the resin section including: a plurality of lens portions, and a plurality of interval portions each of which is provided between adjacent lens portions among the lens portions; and a spacer substrate bonded to one surface of the wafer lens, the spacer substrate having openings at positions corresponding to the lens portions, respectively, wherein the lens portions provided on both sides of the wafer lens are arrayed in row and column directions in a matrix fashion; and the interval portions provided on both sides of the wafer lens include a first interval portion and a second interval portion, a length of the second interval portion being longer than a length of the first interval portion, the method including: a step of bonding the wafer lens and the spacer substrate to each other; a first step of cutting the second interval portion; a second step of cutting the resin section and the glass substrate between a cutting line formed in the first step and the lens portions adjacent to the cutting line; and a third step of cutting the first interval portion and the glass substrate after the first step.

According to a sixth aspect of the present invention, there is provided a method of cutting a laminated wafer lens, the laminated wafer lens including: a first wafer lens including: a glass substrate, and a resin section which is made of energy-curable resin and is provided on each of front and back surfaces of the glass substrate, the resin section including: a plurality of lens portions, and a plurality of interval portions each of which is provided between adjacent lens portions among the lens portions; a second wafer lens bonded to the first wafer lens, the second wafer lens including: a glass substrate, and a resin section which is made of energy-curable resin and is provided on each of front and back surfaces of the glass substrate, the resin section including: a plurality of lens portions, and a plurality of interval portions each of which is provided between adjacent lens portions among the lens portions; and a spacer substrate bonded to one surface of the second wafer lens, the spacer substrate having openings at positions corresponding to the lens portions, respectively, of the second wafer lens, wherein the lens portions provided on both sides of each of the first and second wafer lenses are arrayed in row and column directions in a matrix fashion; and the interval portions provided on both sides of each of the first and second wafer lenses include a first interval portion and a second interval portion, a length of the second interval portion being longer than a length of the first interval portion, the method including: a step of bonding the second wafer lens and the spacer substrate to each other; a first step of cutting the second interval portion of the first wafer lens; a second step of cutting the first and second wafer lenses and the spacer substrate between a cutting line formed in the first step and the lens portions adjacent to the cutting line; and a third step of cutting the first interval portion of the first and second wafer lenses, and the spacer substrate thereat after the first step.

Effects of the Invention

According to the present invention, when a wafer lens is cut into each lens, such a large stress release as to break glass does not occur. As a result, it is possible to provide a lot of lenses having stable optical characteristics. Moreover, such problems can be solved without diminishing the advantage of efficient mass production using wafer lenses.

EMBODIMENTS FOR CARRYING OUT THE INVENTION

Hereinafter, a description is given of a preferred embodiment of the present invention with reference to the drawings.
[Image Pick-Up Device]

Figure 1A:
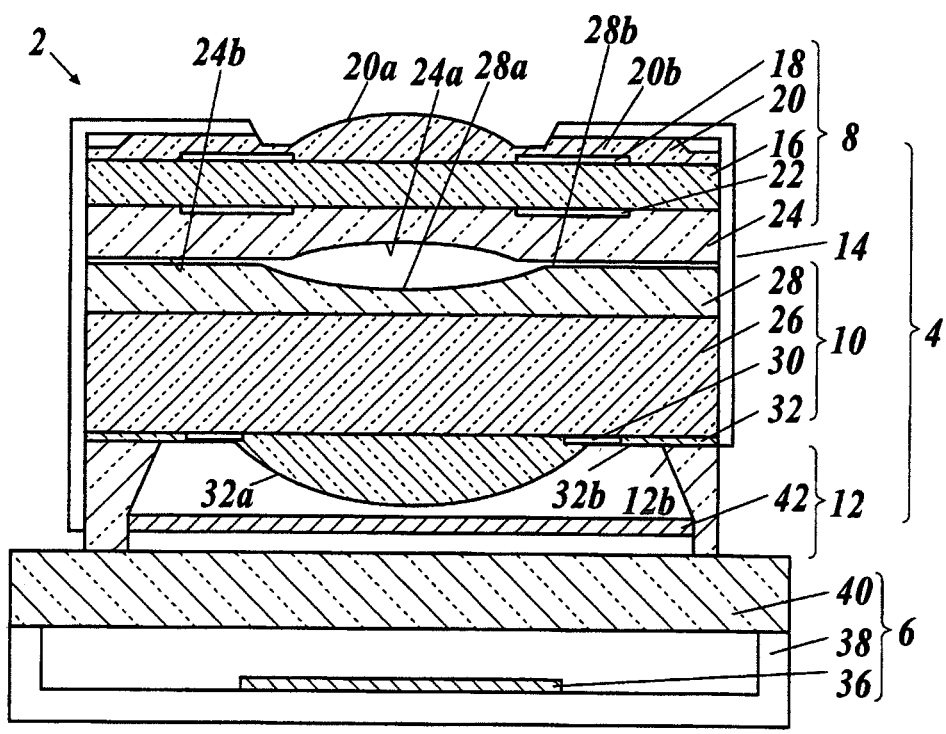
FIG. 1A is a cross-sectional view showing a schematic configuration of an image pick-up device.

As shown in FIG. 1A, an image pick-up device 2 is mainly composed of a lens unit 4 and a sensor unit 6, and the lens unit 4 is provided on the sensor unit 6.

The lens unit 4 is an example of image pick-up lenses and is mainly composed of a lens block 8, a lens block 10, and a spacer 12. The lens blocks 8 and 10 and spacer 12 bonded (adhere, laminated) to each other are covered with a cover package 14.

The lens block 8 includes a plate-shaped glass substrate 16.

On the glass substrate 16 (on an object's side), a diaphragm 18 and a resin section 20 are formed. Under the glass substrate 16 (on an image's side), a diaphragm 22 and a resin section 24 are formed.

At the substantially center of the resin section 24, a convex lens portion 20a having a convex shape is formed.

The resin section 20 except for the part of the convex lens portion 20a is a non-lens portion 20b.

At the substantially center of the resin section 24, a concave lens portion 24a having a concave shape is formed.

The resin section 24 except for the part of the concave lens portion 24a is a non-lens portion 24b.

The lens block 10 also has a plate-shaped glass substrate 26.

On the glass substrate 26 (on the object's side), a resin section 28 is formed. Under the glass substrate 26 (on the image's side), a diaphragm 30 and a resin section 32 are formed.

At the substantially center of the resin section 28, a concave lens portion 28a having a concave shape is formed.

The resin section 28 except for the part of the concave lens portion 28a is a non-lens portion 28b.

At the substantially center of the resin section 32, a convex lens portion 32a having a convex shape is formed.

The resin section 32 except for the part of the convex lens portion 32a is a non-lens portion 32b.

The resin sections 20, 24, 28, and 32 are light transmissive.

The resin sections 20, 24, 28, and 32 are composed of energy-curable resin and are preferably composed of light-curable acrylic resin.

The convex lens portion 20a, concave lens portion 24a, concave lens portion 28a, and convex lens portion 32a of the respective resin sections 20, 24, 28, and 32 serve as lens effective portions having the lens function (optical function).

Figure 3:
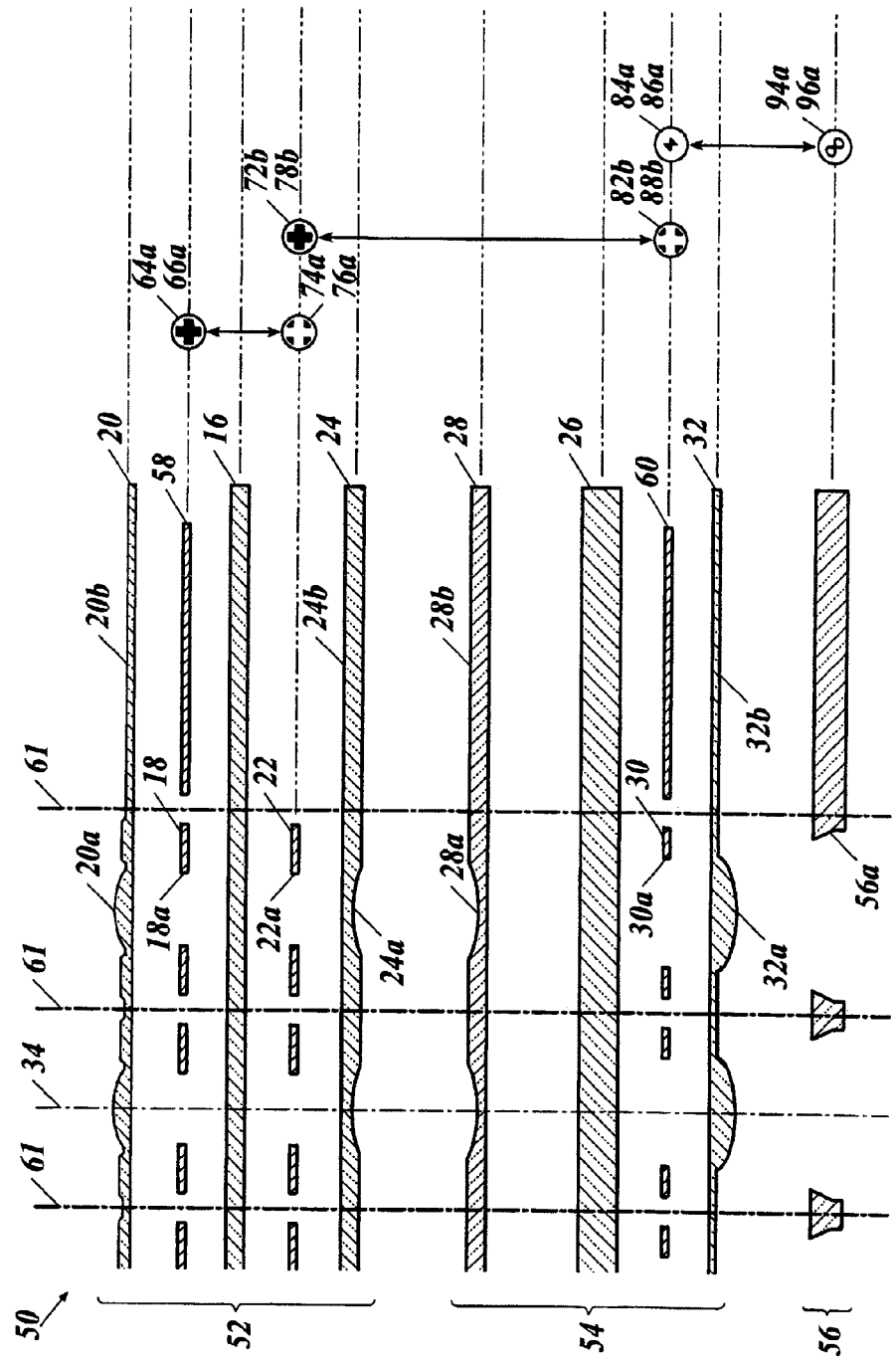
FIG. 3 is an exploded cross-sectional view along a line I-I of FIG. 2.

When the lens blocks 8 and 10 are seen from the object's side (the convex lens portion 20a side), the convex lens portion 20a, concave lens portion 24a, concave lens portion 28a, and convex lens portion 32a are arranged in a concentric manner and are vertically laminated on each other so as to have the same optical axis 34 (see FIG. 3).

Figure 1B:
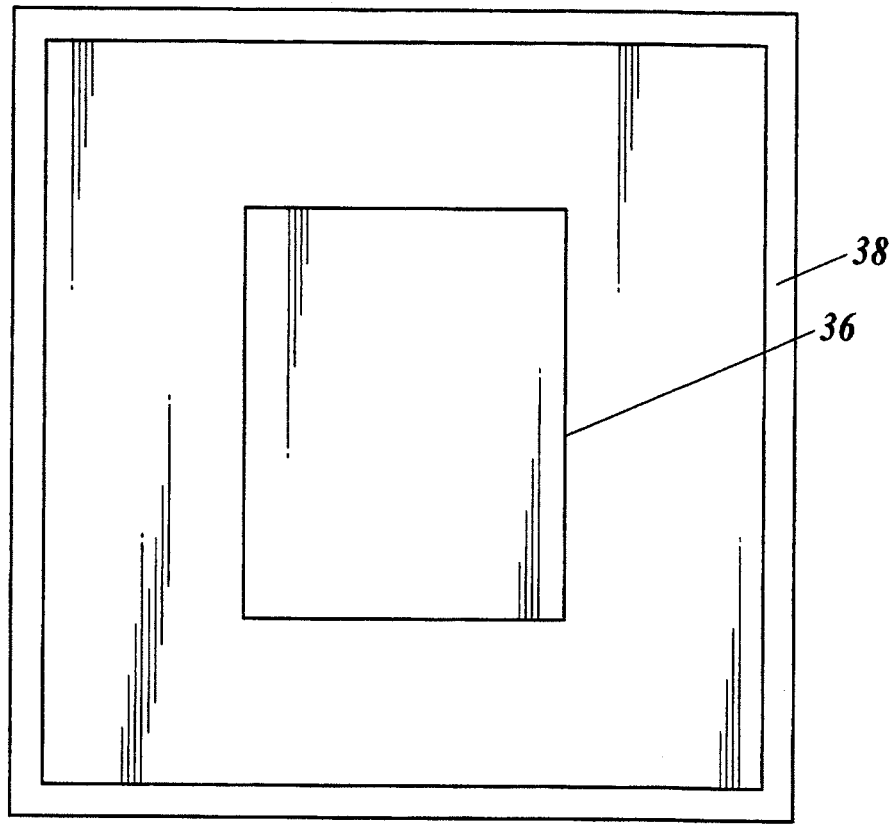
FIG. 1B is a plan view schematically showing a sensor unit of the image pick-up device.

As shown in FIGS. 1A and 1B, the sensor unit 6 is mainly composed of a sensor 36, a package 38, and a cover glass 40.

The sensor 36 is a photo-sensor receiving light transmitted through the lens unit 4. The sensor 36 can photoelectrically convert the received light to electric signal and output the electric signal to an external device (not shown).

The package 38 has a shape of a bottom-closed box and is opened at the top. As shown in FIG. 1B, the sensor 36 is located at the substantially center of the package 38.

The cover glass 40 is provided at the top of the package 38 as a lid. The sensor 36 is sealed in a space surrounded by the package 38 and the cover glass 40.

As shown in FIG. 1A, the spacer 12 is interposed between the lens blocks 8 and 10 and the sensor 36 and gives a certain distance therebetween. The spacer 12 has a circular opening 12b. Inside the opening 12b, an IR cut filter 42 is provided. The IR cut filter 42 is provided above the cover glass 40 and is configured to block infrared light which is directed to the sensor 36.

The IR cut filter 42 may be provided on the object's side and image's side of the glass substrate 16 to be integrally formed with the lens block 8.

[Wafer Lens Laminate]

Figure 2:
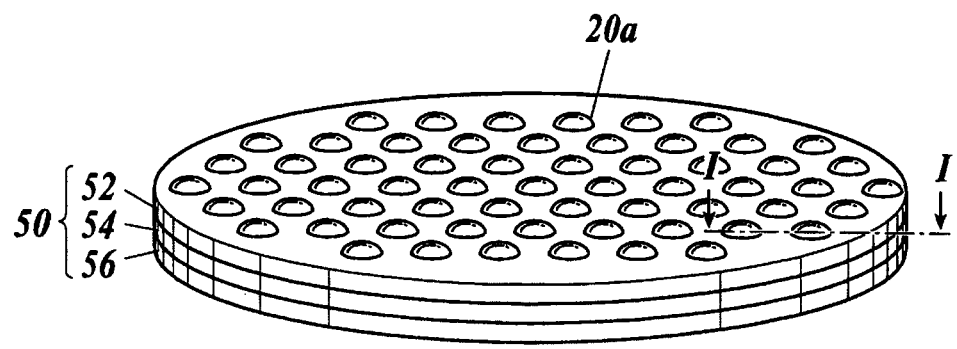
FIG. 2 is a plan view showing a schematic configuration of a wafer lens laminate.

As shown in FIG. 2, a wafer lens laminate 50 is mainly composed of wafer lenses 52 and 54 and a spacer substrate 56, which are laminated on each other. The wafer lens laminate 50 is an example of laminated wafer lenses.

As shown in FIG. 3, the wafer lens 52 includes the wafer-like glass substrate 16.

On the glass substrate 16, the diaphragms 18, an ID recording section 58, and the resin section 20 are formed.

Figure 4:
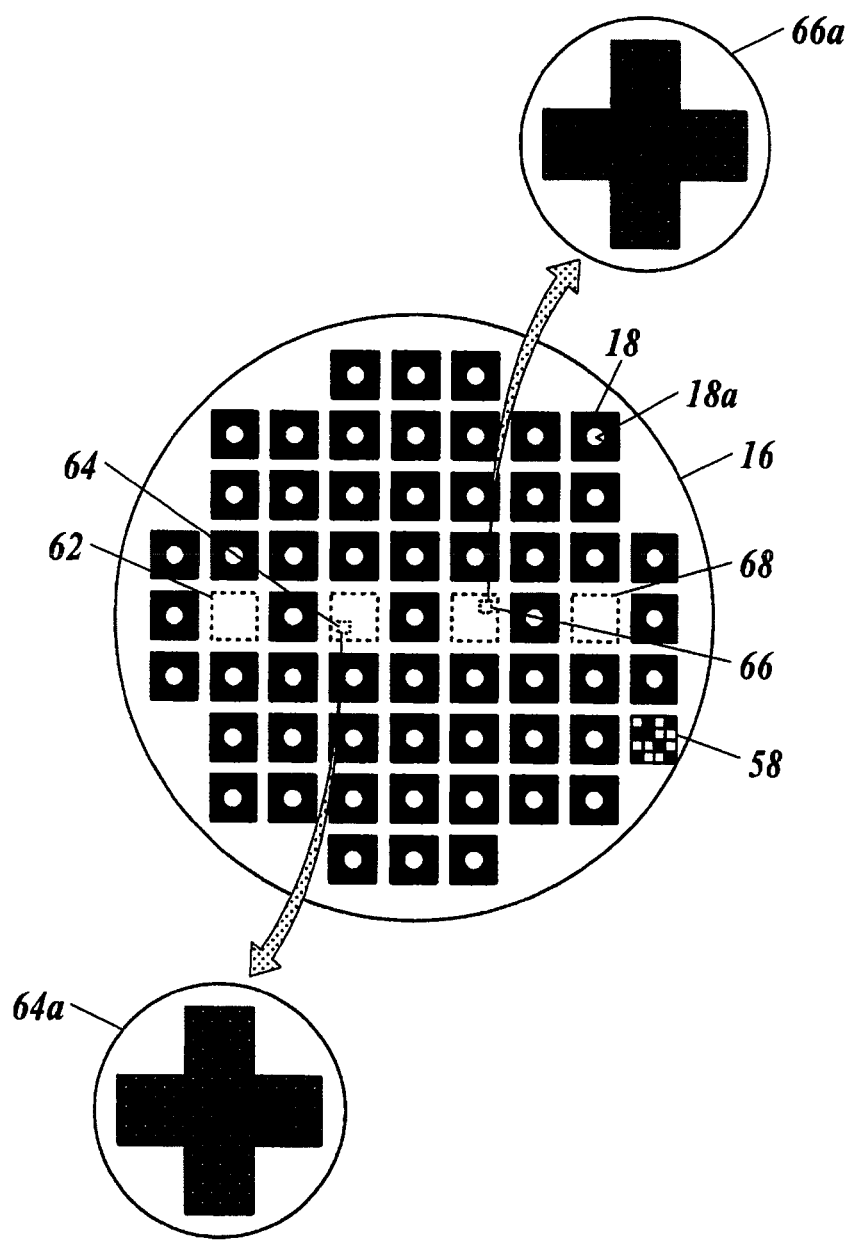
FIG. 4 is a plan view schematically showing a surface S1 (diaphragm pattern) of a glass substrate of a wafer lens.

As shown in FIG. 4, a number of diaphragms 18 are formed on central major part of the glass substrate 16. Each of the diaphragms 18 has a rectangular shape, and at the center of each diaphragm 18, a circular opening 18a is formed. The diaphragms 18 except for the part of the openings 18a may spread all over the surface of the glass substrate 16. The ID recording section 58 is formed in the vicinity of the diaphragms 18.

The glass substrate 16 has four regions 62, 64, 66, and 68, where the diaphragms 18 are not formed. In the inside regions 64 and 66, cross-shaped alignment marks 64a and 66a are formed, respectively.

The diaphragms 18, ID recording section 58, and alignment marks 64a and 66a are made of the same material and are specifically, made of light-blocking photoresist. As the light-blocking photoresist, photoresist mixed with carbon black is applied.

The ID recording section 58 is composed of a two-dimensional bar code. In the ID recording section 58, information is recorded as binary representations with a predetermined number of digits. The information includes a wafer ID of the wafer lens 52. This information is readable by a bar-code reader.

As shown in FIG. 3, the diaphragms 18 and ID recording section 58 are covered with the resin section 20.

The resin section 20 is formed on the surface of the glass substrate 16 where the diaphragms 18 and ID recording section 58 are formed, and includes the convex lens portions 20a and non-lens portions 20b.

Under the glass substrate 16, the diaphragms 22 and resin section 24 are formed.

Figure 5:
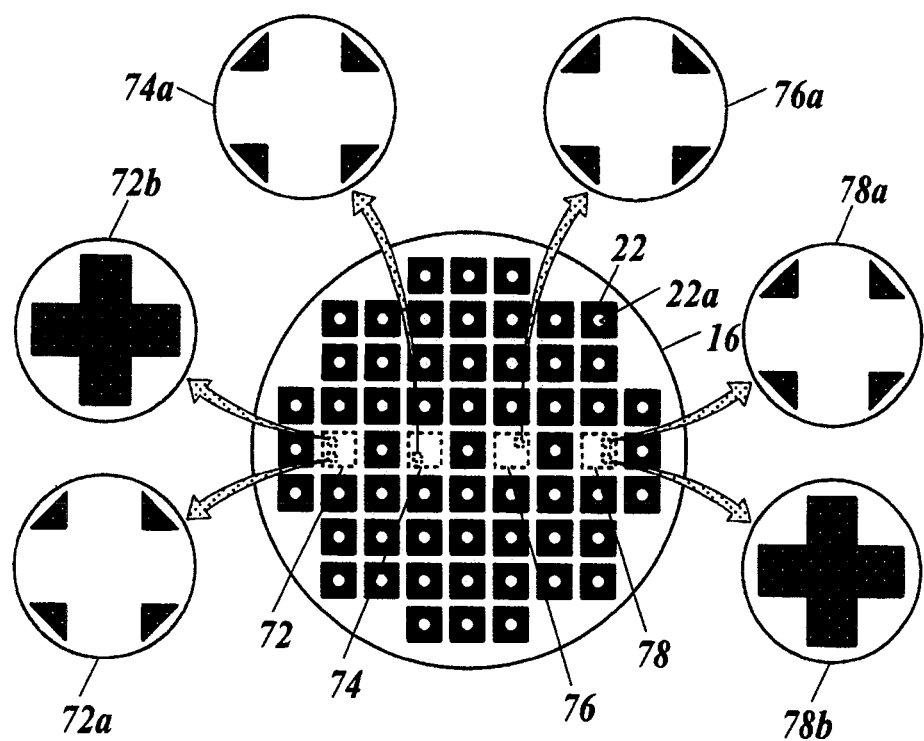
FIG. 5 is a plan view schematically showing a surface S2 (diaphragm pattern) of the glass substrate of the wafer lens.

As shown in FIG. 5, a number of diaphragms 22 are formed on central major part of the glass substrate 16. The diaphragms 22 have the same shape as the diaphragms 18, and each diaphragm 22 includes a circular opening 22a at the center thereof. The diaphragms 22 except for the part of the openings 22a may spread all over the surface of the glass substrate 16.

The glass substrate 16 has four regions 72, 74, 76, and 78, where the diaphragms 22 are not formed, at the positions corresponding to the aforementioned four regions 62, 64, 66, and 68, respectively, where the diaphragms 18 are not formed. In the outside regions 72 and 78, alignment marks 72a and 78a, each of which includes triangles at four corners, and cross-shaped alignment marks 72b and 78b are formed, respectively. In the inside regions 74 and 76, alignment marks 74a and 76a, each of which includes triangles at four corners, are formed, respectively.

The diaphragms 22 and alignment marks 72a, 72b, 74a, 76a, 78a, and 78b are also made of the same material as the diaphragms 18, ID recording section 58, and alignment marks 64a and 66a, i.e., made of light-blocking photoresist.

The diaphragms 22 are covered with the resin section 24.

The resin section 24 includes the concave lens portions 24a located coaxially with the respective convex lens portions 20a.

A section composed of one of the convex lens portions 20a, one of the diaphragms 18, one of the diaphragms 22, and one of the convex lens portions 24a corresponds to a component unit. A number of such units that are held on the glass substrate 16 are unitized with the wafer lens 54 and spacer substrate 56.

As shown in FIG. 3, the wafer lens 54 includes the wafer-like glass substrate 26.

On the glass substrate 26, the resin section 28 is formed.

The resin section 28 includes the concave lens portions 28a located coaxially with the respective convex lens portions 20a.

Under the glass substrate 26, the diaphragms 30, an ID recording section 60, and the resin section 32 are formed.

Figure 6:
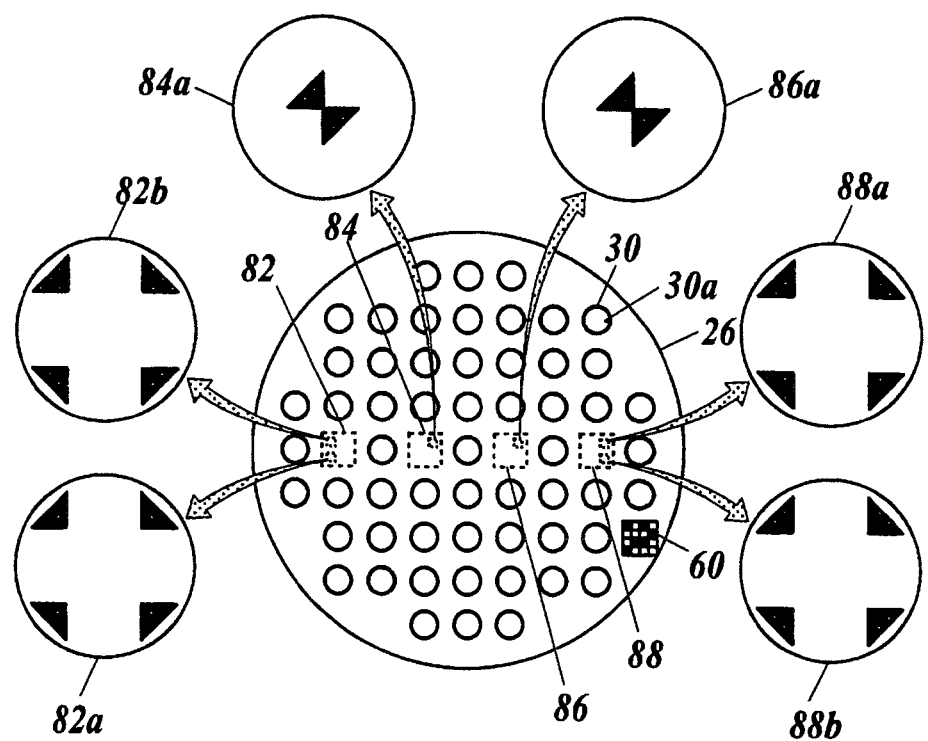
FIG. 6 is a plan view schematically showing a surface S4 (diaphragm pattern) of a glass substrate of a wafer lens.

As shown in FIG. 6, a number of diaphragms 30 are formed on central major part of the glass substrate 26. Each of the diaphragms 30 has a circular shape, and a circular opening 30a is formed at the center of each diaphragm 30. The diaphragms 30 except for the part of the openings 30a may spread all over the surface of the glass substrate 26. The ID recording section 60 is formed in the vicinity of the diaphragms 30.

The glass substrate 26 has four regions 82, 84, 86, and 88, where the diaphragms 30 are not formed, at the positions corresponding to the aforementioned four regions 72, 74, 76, and 78, respectively, where the diaphragms 22 are not formed. In the outside region 82, alignment marks 82a and 82b, each of which includes triangles at four corners, are formed. In the outside region 88, alignment marks 88a and 88b, each of which includes triangles at four corners, are formed. In the inside regions 84 and 86, alignment marks 84a and 86a, each of which includes two triangles opposed to each other, are formed, respectively.

The diaphragms 30, ID recording section 60, and alignment marks 82a, 82b, 84a, 86a, 88a, and 88b are made of the same material as the diaphragms 18, ID recording section 58, and alignment marks 64a and 66a, i.e., made of light-blocking photoresist.

The ID recording section 60 is the same type as the ID recording section 58 and includes a wafer ID of the wafer lens 54.

As shown in FIG. 3, the diaphragms 30 and ID recording section 60 are covered with the resin section 32.

The resin section 32 is formed on the surface of the glass substrate 26 where the diaphragms 30 and ID recording section 60 are formed, and includes the convex lens portions 32a located coaxially with the respective convex lens portions 20a.

A section composed of one of the concave lens portions 28a, one of the diaphragms 30, and one of the convex lens portions 32a corresponds to a component unit. A number of such units that are held on the glass substrate 26 are unitized with the wafer lens 52 and spacer substrate 56.

Figure 7:
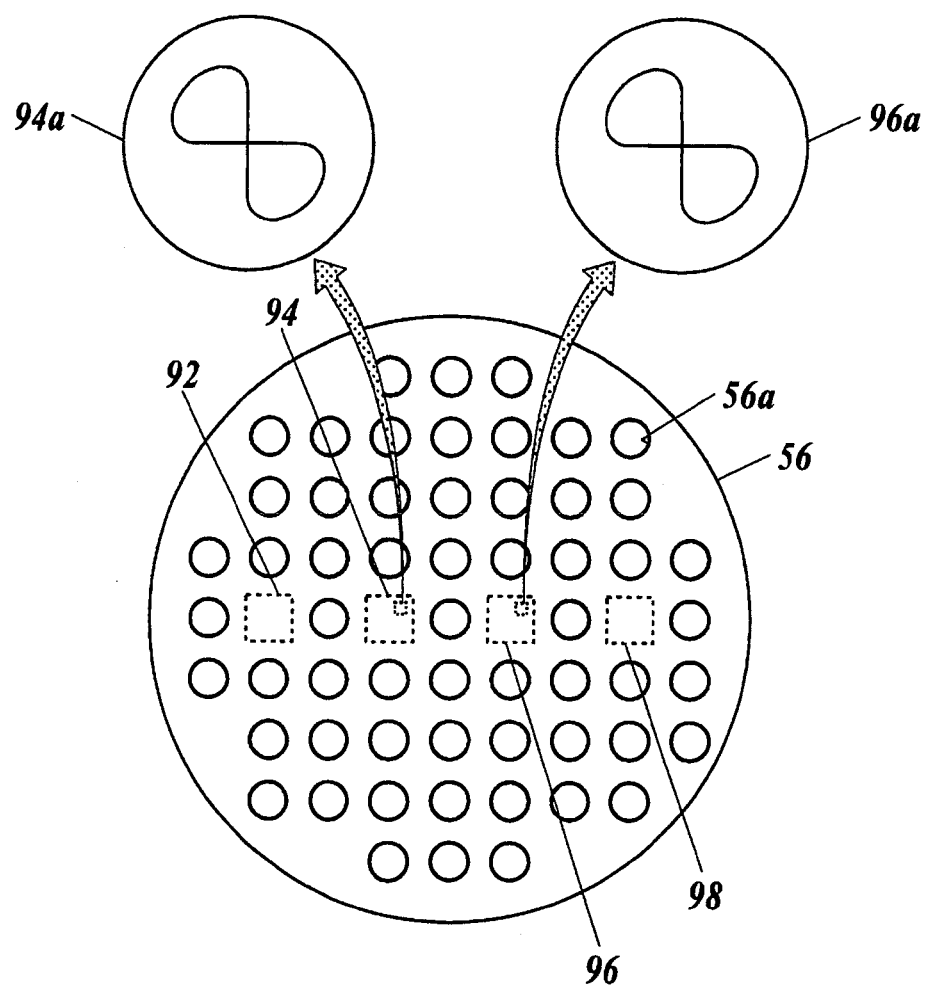
FIG. 7 is a plan view schematically showing a configuration of a spacer substrate.

As shown in FIG. 7, the spacer substrate 56 is a wafer-like glass plate similar to the glass substrates 16 and 26. The spacer substrate 56 includes a number of circular openings 56a.

In the spacer substrate 56, there are four regions 92, 94, 96, and 98, where the openings 56a are not formed. In the inside regions 94 and 96, 8-shaped alignment marks 94a and 96a are formed, respectively.

The alignment marks 94a and 96a are made of the same material as the diaphragms 18, ID recording section 58, and alignment marks 64a and 66a, i.e., made of light-blocking photoresist.

In the wafer lens laminate 50, the convex lens portion 20a, opening 18a of the diaphragm 18, opening 22a of the diaphragm 22, concave lens portion 24a, concave lens portion 28a, opening 30a of the diaphragm 30, convex lens portion 32a, and opening 56a of the spacer substrate 56 (sequentially from the top to the bottom in FIG. 3) are arranged on the same optical axis 34. These are cut collectively along dicing lines 61 to form the lens unit 4 (described later).

In the wafer lens laminate 50, the regions 62, 64, 66, and 68 of the glass substrate 16; the regions 72, 74, 76, and 78 of the glass substrate 16; the regions 82, 84, 86, and 88 of the glass substrate 26; and the regions 92, 94, 96, and 98 of the spacer substrate 56 correspond one-on-one, respectively. The alignment marks are used for alignment of the members (see FIGS. 4 to 7).

[Manufacturing Method of Image Pick-Up Device]

Next, a description is given of a method of manufacturing the image pick-up device 2 (the lens unit 4, in particular).

The image pick-up device 2 is manufactured roughly through the following steps.

(S1) The wafer lenses 52 and 54 and spacer substrate 56 are prepared (manufactured).

(S2) The wafer lenses 52 and 54 and spacer substrate 56 are bonded to each other to manufacture the wafer lens laminate 50.

(S3) The wafer lens laminate 50 is cut to manufacture the lens units 4.

(S4) Each of the lens units 4 is bonded to the sensor unit 6.

In Step S1, first, the diaphragms 18 and 22 and ID recording section 58 are formed on the glass substrate 16, and the diaphragms 30 and ID recording section 60 are formed on the glass substrate 26.

To be specific, light-blocking photoresist is applied to the glass substrates 16 and 26. Then, the glass substrates 16 and 26 are exposed to light through a mask having a predetermined pattern to be developed, thus forming the diaphragms 18, 22, and 30 and the ID recording sections 58 and 60.

Subsequently, the resin sections 20 and 24 are formed on the glass substrate 16, and the resin sections 28 and 32 are formed on the glass substrate 26.

Herein, a description is given of a method of molding the resin section 20 (lens portions 20a) in detail.

Figure 8A:
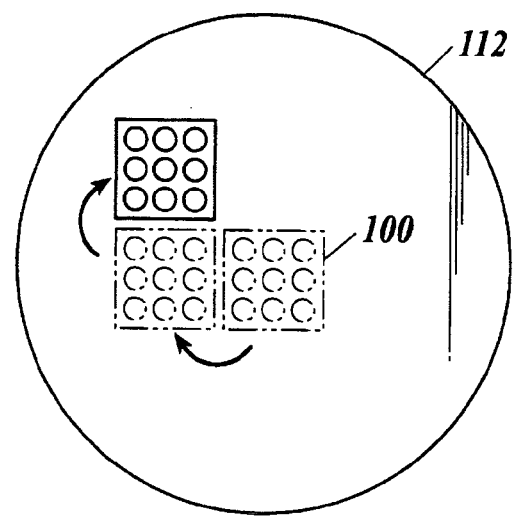
FIG. 8A is a view schematically explaining a method of molding a resin section of the wafer lens.
Figure 8B:
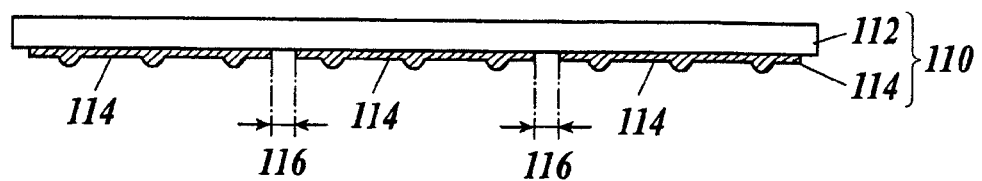
FIG. 8B is a view schematically showing a step following that of FIG. 8A.

As shown in FIG. 8A, a concave mold 100 (a mold having concave portions corresponding to the shape of the lens portions 20a) is moved relative to a wafer-like substrate 112 by a predetermined amount while filling the space between the concave mold 100 and the substrate 112 with resin, thus producing a first transfer mold 110. In the first transfer mold 110, as shown in FIG. 8B, resin-molded portions 114 are formed corresponding to the movement of the concave mold 100 for each block (on a block-by-block basis), and minute gaps 116 (grooves) are formed between the resin-molded portions 114.

Figure 8C:
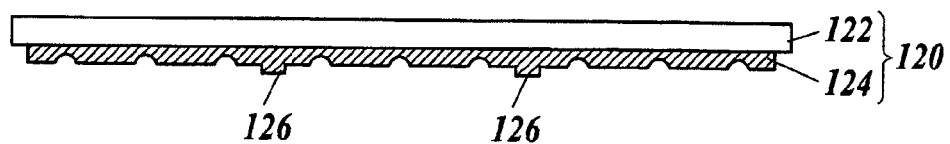
FIG. 8C is a view schematically showing a step following that of FIG. 8B.

Thereafter, the first transfer mold 110 is used as a shaping mold to produce a second transfer mold 120 shown in FIG. 8C. In this case, the space between the first transfer mold 110 and a wafer-like substrate 122 is filled with resin to form a resin-molded portion 124. To the second transfer mold 120, the entire shape of the first transfer mold 110 (including the resin-molded portions 114 and gaps 116) is directly transferred. Accordingly, the resin-molded portion 124 does not have gaps like the gaps 116 but is integrally molded. On the resin-molded portion 124, protrusions 126 (elongated protrusions) are formed corresponding to the gaps 116.

Figure 8D:
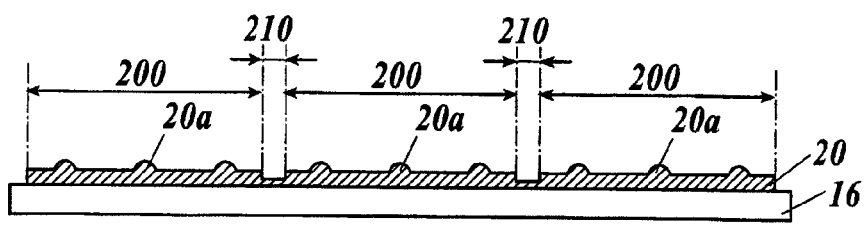
FIG. 8D is a view schematically showing a step following that of FIG. 8C.

Then, the second transfer mold 120 is used as a shaping mold to form the resin section 20 on the glass substrate 16 as shown in FIG. 8D. The resin section 20 includes the plurality of convex lens portions 20a corresponding to the shape of the concave mold 100. The convex lens portions 20a are partitioned into a plurality of blocks 200 corresponding to the movement of the concave mold 100. Between the bocks 200, recesses 210 (grooves) are formed, which recesses 210 correspond to the protrusions 126 of the second transfer mold 120 (which are formed in accordance with the movement of the concave mold 100).

As described above, the resin section 20 is formed on the glass substrate 16 by the method using the concave mold 100 and first and second transfer molds 110 and 120.

Thereafter, the resin section 24 is formed on the glass substrate 16 in a way similar to the way of forming the resin section 20 on the glass substrate 16 (at this time, a convex mold is used instead of the concave mold 100). In addition, the resin sections 28 and 32 are formed on the glass substrate 26. The wafer lenses 52 and 54 are thus manufactured.

Figure 9:
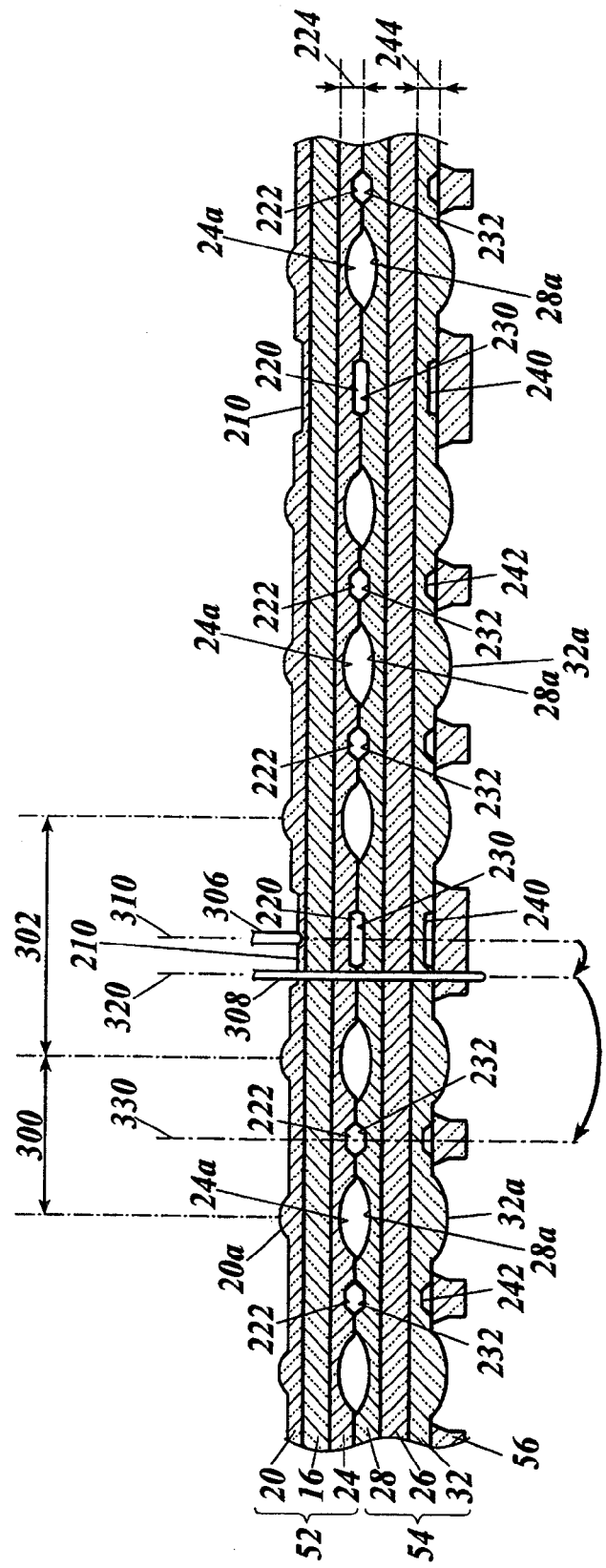
FIG. 9 is a partial cross-sectional view showing a schematic configuration of a wafer lens laminate.

In this case, as shown in FIG. 9, in the resin section 24 of the wafer lens 52, recesses 220 (grooves) corresponding to the movement of the convex mold; and recesses 222 (grooves) corresponding to the shape of the convex mold are formed. The resin portions at recesses 220 and 222 have thickness (bottom thickness) smaller than the thickness 224 of the resin section 24. Also in the resin section 28 of the wafer lens 54, recesses 230 (grooves) corresponding to the movement of the convex mold; and recesses 232 (grooves) corresponding to the shape of the convex mold are formed. In the resin section 32 of the wafer lens 54, recesses 240 (grooves) corresponding to the movement of the concave mold; and recesses 242 (grooves) corresponding to the shape of the concave mold are formed. The resin portions at the recesses 240 and 242 have a thickness smaller than the thickness 244 of the resin section 32.

Although the recesses 222 are formed in this embodiment, they do not necessarily need to be formed depending on the shape of the molded lenses because the recesses 222 are formed in consideration of shrink marks of the resin. As apparent from the above description, the recesses 220, which are formed corresponding to the movement of the convex mold, are also not necessarily formed if the shaping mold is not formed in units of the block 200 through the so-called step-and-repeat method.

In Step S2, the recesses 220, 222, 230, 232, 240, and 242 are filled with a different type of resin from the resin composing the resin sections 24, 28, and 32. By filling the recesses 220, 222, 230, 232, 240, and 242 with the resin, the glass substrates 16 and 26 can be prevented from cracking in the process of cutting the wafer lens laminate 50.

The recesses 220, 230, and 240 are formed between the blocks 200, and, even if the glass substrates 16 and 26 crack in the process of cutting the wafer lens laminate 50, the cracks are not a serious problem for manufacturing of the lens units 4. Accordingly, the recesses 220, 230, and 240 do not necessarily need to be filled with the resin.

Subsequently, as shown in FIG. 3, the alignment marks 72b and 78b of the wafer lens 52 are aligned with the alignment marks 82b and 88b, respectively, of the wafer lens 54, and the alignment marks 84a and 86a of the wafer lens 54 are aligned with the alignment marks 94a and 96a, respectively, of the spacer substrate 56. The wafer lenses 52 and 54 and the spacer substrate 56 are bonded (laminated/adhere) to each other, thus manufacturing the wafer lens laminate 50. As a result, as shown in FIG. 9, the convex lens portion 20a, concave lens portion 24a, concave lens portion 28a, and convex lens portion 32a of the respective resin sections 20, 24, 28, and 32 are arranged at the position corresponding to each other (on the same axis).

In Step S3, the wafer lens laminate 50 is cut in a matrix fashion (in a grid) so that each piece includes one convex lens portion 20a.

Figure 10:
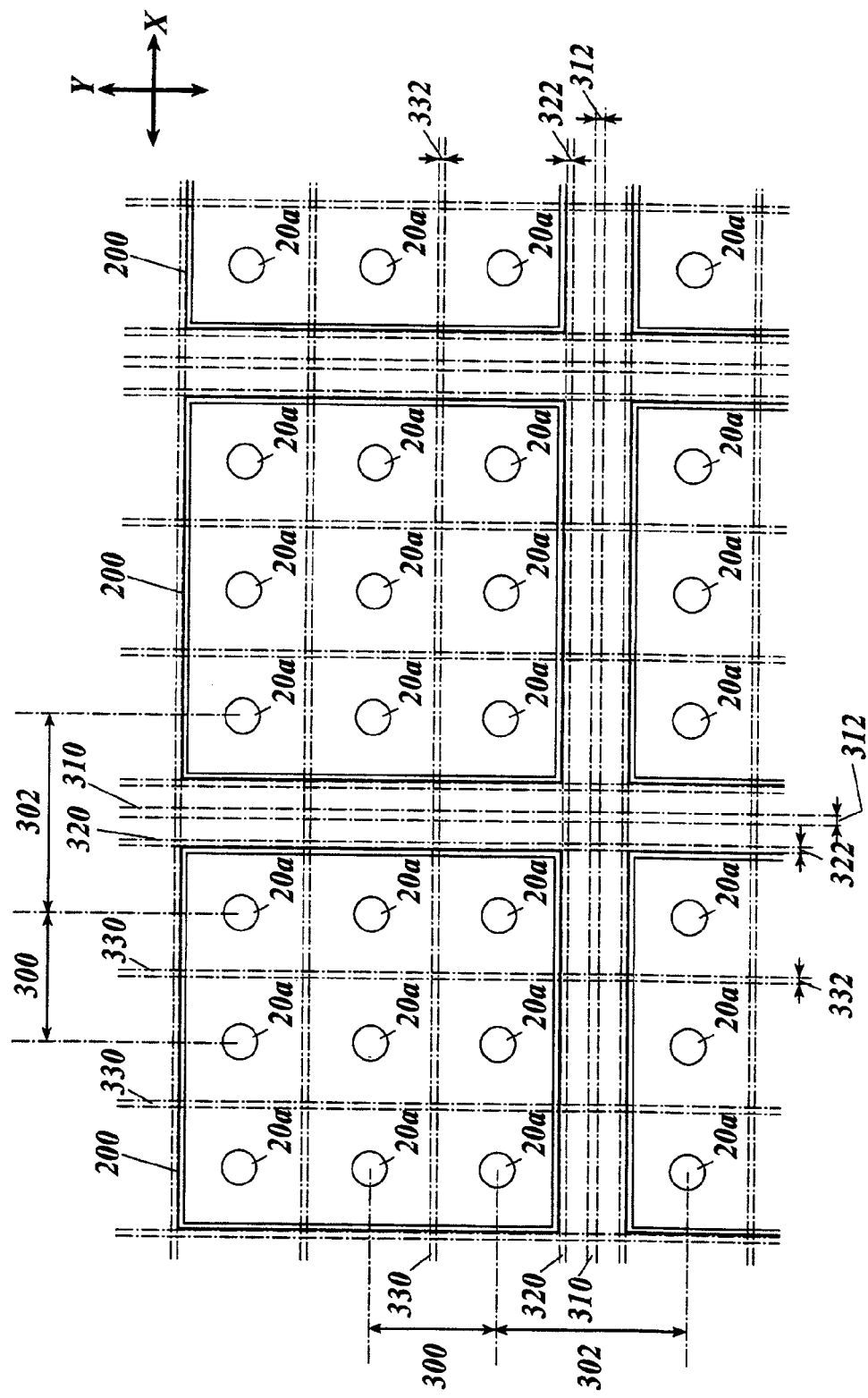
FIG. 10 is a partial plan view showing a schematic configuration of the wafer lens laminate.

As shown in FIG. 10, the convex lens portions 20a are arranged so as to be partitioned for each block 200.

To be specific, the convex lens portions 20a are arrayed so as to form lines in the traverse direction (in the row direction) and lines in the longitudinal direction (in the column direction) in FIG. 10. That is, the convex lens portions 20a are arrayed in a matrix fashion as a whole. The concave lens portions 24a, concave lens portions 28a, and convex lens portions 32a are arranged in a similar fashion to the convex lens portions 20a. Herein, the row and column directions are directions orthogonal to each other on the same plane.

Between convex lens portions 20a within the same block 200, which convex lens portions 20a are arranged along the row or column direction, interval portions 300 are formed as apart of the resin section 20. Similarly, interval portions 302 are formed between convex lens portions 20a of different blocks 200, which convex lens portions 20a are arranged along the row or column direction. The length between the convex lens portions 20a at the interval portions 302 is longer than that at the interval portions 300.

In Step S3, the wafer lens laminate 50 is cut basically according to the following sequence of steps.
(S3-1) The wafer lens laminate 50 is cut along cutting lines between the blocks 200.
(S3-2) The wafer lens laminate 50 is cut along cutting lines at the outer frame.
(S3-3) The wafer lens laminate 50 is cut along cutting lines within each block 200.

Figure 11:
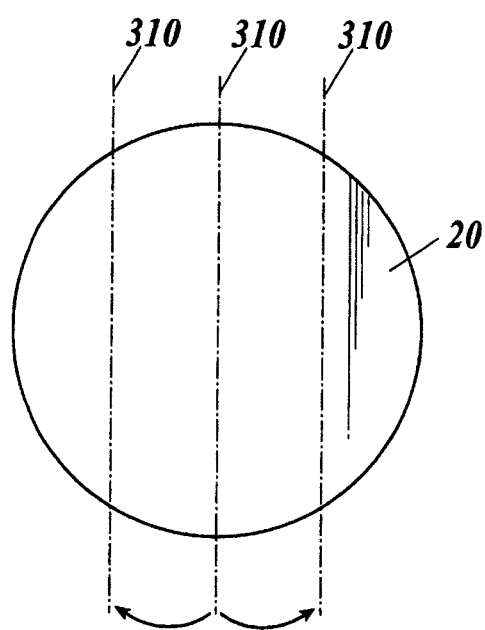
FIG. 11 is a plan view schematically explaining the order of cutting the resin section.

In Step S3-1, as shown in FIGS. 9 and 10, the portions of the resin section 20 between the blocks 200, i.e., the interval portions 302 of the resin section 20 is cut along cutting lines 310 in the row and/or column direction by using a cutting blade 306. As shown in FIG. 11, it is preferable that the cutting be performed firstly along the cutting line 310 at or near the center of the resin section 20, and after that, performed along the cutting lines 310 located at such positions that the portions into which the resin section 20 is divided by the cutting lines 310 have the same area. This prevents the areas (volumes) of the resin section 20 from being unequal. Accordingly, the resin section 20 becomes less likely to be separated from the glass substrate 16.

In Step S3-2, the wafer lens laminate 50 is cut by using a cutting blade 308 along a cutting line 320 located between the cutting line 310 and the convex lens portions 20a adjacent to the cutting line 310, from the resin section 20 to the spacer substrate 56, in the row and column directions. Thereby, the wafer lens laminate 50 is divided into the blocks 200.

In Step S3-3, the wafer lens laminate 50 is cut by using the cutting blade 308 along cutting lines 330 formed within each block 200, from the resin section 20 to the spacer substrate 56, in the column and row directions. Thereby, each of the blocks 200 of the wafer lens laminate 50 is divided so as to separate the convex lens portions 20a. The plurality of lens units 4 are thus manufactured.

In Step S3, preferably, the edge width of the cutting blade 306 is larger than that of the cutting blade 308, to make a cut width 312 of the cutting line 310 larger than each of the cut widths 322 and 332 of the cutting lines 320 and 330, respectively.

This can reduce the interference between the cutting blade 306 at the cutting lines 310 and the cuts along the cutting lines 320 and 330. Accordingly, scattering of resin due to the interference during cutting can be avoided.

Basically, in Step S3-1, only the resin section 20 is cut. However, the glass substrate 16 may be partially cut, or the wafer lens laminate 50 itself may be cut from the resin section to the spacer substrate 56.

In steps S3-2 and S3-3, the cutting by Step S3-3 (cutting along the cutting lines 330) may be performed before the cutting by Step S3-2 (cutting along the cutting lines 320).

In Step S4, the IR cut filter 42 is provided in the spacer 12 of the lens unit 4, and the lens unit 4 and the sensor unit 6 are bonded to each other. Then, the lens unit 4 is covered with the cover package 14. The image pick-up device 2 is thus manufactured.

According to the embodiment described above, the resin section 20 includes the interval portions 302 whose length is longer than the interval portions 300, between the blocks 200. In Step S3, first, the resin section 20 is cut along the cutting line 310, and then, the resin section 20 is cut again along the cutting lines 320. The cutting along the cutting lines 310 can reduce the stress of the resin section 20. Even if the glass substrate 16 cracks in the process of cutting along the cutting line 310, the wafer lenses 52 and 54 including the glass substrate 16 and spacer substrate 56 are cut along the cutting lines 320 again. Therefore, the lens units 4 can be prevented from becoming defective products even if the glass substrate 16 cracks.

The lens blocks 8 and 10 may be manufactured by cutting the wafer lenses 52 and 54 individually (without being laminated on each other), and then, the separate lens blocks 8 and 10 may be bonded to each other.

In such a case, cutting of the wafer lenses 52 and 54 may be separately performed in the manner similar to the aforementioned step S3. In Step S3-1, in particular, the resin sections 20 and 24 of the wafer lens 52 (or the resin sections 28 and 32 of the wafer lens 54) may be cut at both surfaces.

In the above, explanations are given by using the terms "cutting lines 310, 320, and 330" for convenience sake. However, such marks or shapes do not necessarily need to be formed in advance on the wafer lenses 52 and 54. In other words, the terms "cutting lines 310, 320, and 330" are used only to show that the resin section is cut at these lines.

The wafer lens laminate 50 may be composed of the wafer lens 52 and spacer substrate 56. In such a case, the resin section 24 of the wafer lens 52 is bonded to the spacer substrate 56.

In this case, cutting of the wafer lens laminate 50 is performed in the manner similar to the aforementioned step S3.

INDUSTRIAL APPLICABILITY

The present invention is used to cut a wafer lens or laminated wafer lens, and is excellent for solving problems caused by cracks of the glass substrate and, at the same time, for reducing the stress of the resin section on the glass substrate, in particular.

REFERENCE NUMERALS

2 IMAGE PICK-UP DEVICE
4 LENS UNIT
6 SENSOR UNIT
8, 10 LENS BLOCK
12 SPACER
12b OPENING
14 COVER PACKAGE
16 GLASS SUBSTRATE
18 DIAPHRAGM
18a OPENING
20 RESIN SECTION
20a CONVEX LENS PORTION
20b NON-LENS PORTION
22 DIAPHRAGM
24 RESIN SECTION
24a CONCAVE LENS PORTION
24b NON-LENS PORTION
26 GLASS SUBSTRATE
28 RESIN SECTION
28a CONCAVE LENS PORTION
28b NON-LENS PORTION
30 DIAPHRAGM
32 RESIN SECTION
32a CONVEX LENS PORTION
32b NON-LENS PORTION
34 OPTICAL AXIS
36 SENSOR
40 COVER GLASS
42 IR CUT FILTER
50 WAFER LENS LAMINATE
52, 54 WAFER LENS
56 SPACER SUBSTRATE
56a OPENING
58, 60 ID RECORDING SECTION
61 DICING LINE
62, 64, 66, 68 REGION
64a, 66a ALIGNMENT MARK
72, 74, 76, 78 REGION
72a, 72b, 74a, 76a, 78a, 78b ALIGNMENT MARK
82, 84, 86, 88 REGION
82a, 82b, 84a, 86a, 88a, 88b ALIGNMENT MARK
92, 94, 96, 98 REGION
94a, 96a ALIGNMENT MARK
100 CONCAVE MOLD
110 FIRST TRANSFER MOLD
112 SUBSTRATE
114 RESIN MOLDED PORTION
116 GAP
120 SECOND TRANSFER MOLD
122 SUBSTRATE
124 RESIN-MOLDED PORTION
126 PROTRUSION
200 BLOCK
210 RECESS
220, 222 RECESS
224 THICKNESS
230, 323 RECESS
240, 242 RECESS
244 THICKNESS
300, 302 INTERVAL PORTION
306, 308 CUTTING BLADE
310, 320, 330 CUTTING LINE

The invention claimed is:

1. A laminated wafer lens comprising:
a wafer lens including:
 a glass substrate; and
 a resin section which is made of energy-curable resin and is provided on a surface of the glass substrate, the resin section including:
  a plurality of lens portions, and
  a plurality of interval portions each of which is provided between adjacent lens portions among the lens portions; and
a spacer substrate bonded to one surface of the wafer lens, the spacer substrate having openings at positions corresponding to the lens portions, respectively, wherein
the lens portions are arrayed in row and column directions in a matrix fashion;

the interval portions include a first interval portion and a second interval portion, a length of the second interval portion being longer than a length of the first interval portion; and the spacer substrate includes interval portions each of which is provided between adjacent openings among the openings, the interval portions of the spacer substrate including a third interval portion and a fourth interval portion, the third interval portion corresponding to the first interval portion, the fourth interval portion corresponding to the second interval portion, and a length of the fourth interval portion being longer than a length of the third interval portion.

2. A laminated wafer lens comprising:
a wafer lens including:
   a glass substrate, and
   a resin section which is made of energy-curable resin and is provided on each of front and back surfaces of the glass substrate, the resin section including:
      a plurality of lens portions, and
      a plurality of interval portions each of which is provided between adjacent lens portions among the lens portions; and
a spacer substrate bonded to one surface of the wafer lens, the spacer substrate having openings at positions corresponding to the lens portions, respectively, wherein
the lens portions provided on both sides of the wafer lens are arrayed in row and column directions in a matrix fashion;
the interval portions provided on both sides of the wafer lens include a first interval portion and a second interval portion, a length of the second interval portion being longer than a length of the first interval portion; and
the spacer substrate includes interval portions each of which is provided between adjacent openings among the openings, the interval portions of the spacer substrate including a third interval portion and a fourth interval portion, the third interval portion corresponding to the first interval portion, the fourth interval portion corresponding to the second interval portion, and a length of the fourth interval portion being longer than a length of the third interval portion.

3. The laminated wafer lens according to claim 2, wherein a recess is provided in the second interval portion on a side of the wafer lens bonded to the spacer substrate; and
a thickness of the second interval portion having the recess is smaller than a thickness of the first interval portion.

4. The laminated wafer lens according to claim 2, wherein a plurality of convex lens portions are provided on one surface of the wafer lens on an object's side, and a plurality of concave lens portions are provided on the other surface of the wafer lens on an image's side; and
the concave lens portions are provided in the resin section provided on the side of the wafer lens bonded to the spacer substrate.

5. The laminated wafer lens according to claim 2, wherein a recess is provided in the first interval portion on the side of the wafer lens bonded to the spacer substrate, and the recess provided in the first interval portion is filled with a different type of resin from the resin composing the resin section.

6. A method of cutting a laminated wafer lens, the laminated wafer lens comprising:
a wafer lens including:
   a glass substrate, and
   a resin section which is made of energy-curable resin and is provided on each of front and back surfaces of the glass substrate, the resin section including:
      a plurality of lens portions, and
      a plurality of interval portions each of which is provided between adjacent lens portions among the lens portions; and
a spacer substrate bonded to one surface of the wafer lens, the spacer substrate having openings at positions corresponding to the lens portions, respectively, wherein
the lens portions provided on both sides of the wafer lens are arrayed in row and column directions in a matrix fashion; and
the interval portions provided on both sides of the wafer lens include a first interval portion and a second interval portion, a length of the second interval portion being longer than a length of the first interval portion, the method comprising:
a step of bonding the wafer lens and the spacer substrate to each other;
a first step of cutting the second interval portion of the wafer lens;
a second step of cutting the wafer lens and the spacer substrate between a cutting line formed in the first step and the lens portions adjacent to the cutting line; and
a third step of cutting the wafer lens and the spacer substrate at a position of the first interval portion after the first step.

7. The method of cutting the laminated wafer lens according to claim 6, further comprising:
a step of forming a first recess in the second interval portion on the side of the wafer lens bonded to the spacer substrate;
a step of forming a second recess in the first interval portion on the side of the wafer lens bonded to the spacer substrate; and
a step of filling the second recess with a different type of resin from the resin composing the resin section provided on the side of the wafer lens bonded to the spacer substrate, before the step of bonding the wafer lens and the spacer substrate to each other.

8. The method of cutting the laminated wafer lens according to claim 6, wherein
in the first step, the wafer lens and the spacer substrate are cut.

9. The method of cutting the laminated wafer lens according to claim 6, wherein
a width of a cut made in the first step is larger than a width of a cut made in the second or third step.

10. The method of cutting the laminated wafer lens according to claim 6, wherein
in the first step, only the resin section of the wafer lens is cut or the glass substrate is partially cut along with the resin section of the wafer lens; and
the second step or the third step is performed in a state where the glass substrate of the wafer lens is not divided along the cutting line formed in the first step.

* * * * *